United States Patent Office 3,682,848
Patented Aug. 8, 1972

---

3,682,848
RESINOUS MICROPOROUS TRANSFER STRUCTURE
Robert Craig Virnelson, South Euclid, Ohio, assignor to Buckeye Ribbon & Carbon Company, Cleveland, Ohio
No Drawing. Filed Apr. 20, 1970, Ser. No. 30,234
Int. Cl. C08f 47/08
U.S. Cl. 260—2.5 M                  13 Claims

---

ABSTRACT OF THE DISCLOSURE

A resinous, microporous, reticulated transfer structure for absorbing and subsequently expressing a predetermined material, such as ink, characterized by having a pore size sufficiently large to enable the structure to be repeatedly reloaded with the material and yet sufficiently small to avoid objectional leaking and exudation of the material.

---

A process for forming the microporous structure, by which a range of the desired pore sizes is possible, comprises completely melting a thermoplastic resin, forming an emulsion with the melted resin by means of a liquid, preferably an organic liquid, that is incompatible with the melted resin, and then cooling to break the emulsion and form a separated, microporous, reticulated structure of the resin. Preferably, the rate of cooling is used to control pore size.

BACKGROUND OF THE INVENTION

In porous structures for use as stamps, pads, rollers, and the like, it is desirable that ink or other materials be readily absorbed by the structure so that it may be repeatedly recharged. As a rule, however, material which is readily absorbed is also readily released, resulting in undesirable leakage and seepage of the material from the porous structure when not needed.

Resinous microporous pads originally introduced tended to leak rather badly, much more than for corresponding structures of rubber. This is though to be due to the lesser resiliency of most thermoplastic resins as compared to rubber. In order to express the ink, it was found that synthetic resinous structures must be more or less saturated with the ink or other material. The originally developed microporous resinous pads were, therefore, not satisfactory. Unless the pores were large enough so that a liquid could be readily absorbed, the pads were not readily usable; and yet when pores of the necessary size were made, the liquid which was absorbed was also too readily released, so as to make the saturated, resinous, porous structure messy and and difficult to use.

In order to reduce the pore size in resinous microporous structures, it was proposed to sinter powders or granules of a thermoplastic synthetic resin, using a moderate pressure, so that the granules adhered together. Instead of heat, solvents could also be used for this purpose. In either case, the particles were tightly bonded together, the interstices between them defining the pores. However, these procedures did not always result in uniform structures. When the thermoplastic synthetic resins were heated above their softening points, they tended to deform readily and flow even under slight pressures. This resulted in non-uniform pores in segregated sections and even caused the structure to collapse or to bond together to such an extent that the mass lost its porosity. The smaller the particle size of the synthetic plastic, the more difficult it is to prepare a porous material by this technique.

In preparing resinous microporous structures of relatively small pore size, it has also been proposed to include ink or the like already in place as the reticulated network formed. In this manner, it was not necessary to load the microporous structure after its formation, and the pores could be made especially small. U.S. Pat. 2,777,824 to Leeds, for example, teaches mixing resin particles with a plasticizer and then adding an ink vehicle which is compatible with the mixture below fusion temperatures of the resin particles but incompatible at such temperatures. Upon heating the mixture, the particles fuse together and the ink vehicle is exuded and entrapped within the pores formed between the fused particles. The pores of a product formed in this fashion are extremely small, for instance, less than one micron. U.S. Pat. 3,055,297 to Leeds is similar.

U.S. Pat. 3,427,277 to Davis also discloses a process for producing a resinous, microporous structure which is formed with a liquid such as ink already in place. According to this patent, a microporous structure is obtained from a mixture of unsymmetrical polyamide and a liquid which is a non-solvent at room temperature but a solvent at an elevated temperature. The mixture is heated to form a homogenous liquid and then cooled to form a gel. A substance to be dispensed from the gel such as ink is dispersed in the liquid prior to gel formation. The pore size in the resulting structure is also quite small, ranging from about one to about three microns.

The pore size of the products of the cited patents are so small that inevitably a resinous structure having pores of three microns or less is not capable of absorbing an external charge by normal reloading techniques. In order to prepare a structure useful as a stamp pad or the like, it is essential in the processes of the cited patents to introduce ink or the equivalent into the pores of the material in situ, that is, while the material is actually being formed. The life of such a microporous structure, is therefore, unavoidably limited to the supply of ink present at its creation. When that supply is exhausted, the microporous structure becomes unusuable and can only be discarded.

An object of the present invention is to provide an improved structure that is adapted to absorb and express a predetermined material a plurality of times by possessing a pore size conducive both to minimal or no leakage of the material and to facilitate recharging or reloading with such material.

SUMMARY OF THE INVENTION

In accordance with the present invention, a thermoplastic resin, such as polyethylene, is heated to a temperature sufficient to melt it and then mixed with an incompatible liquid, preferably an organic liquid such as polyol like ethyl hexane diol, to form an emulsion in which the resin is the discontinuous phase and the organic liquid is the continuous phase. Upon subsequent cooling, the emulsion breaks and a microporous, reticulated structure of the resin forms and separates from the incompatible liquid. The average pore size created in a structure subjected to this treatment may range from about 10 microns to about 60 microns, although pore sizes outside this range are possible. Pore sizes within the range are sufficiently small to inhibit leakage of a liquid like ink and yet sufficiently large to permit loading of the microporous structure by usual means.

In the preferred practice, the size of the pores of the resulting microporous structure is controlled by the rate of cooling the resin-liquid emulsion. Also, additives introduced into the emulsion, such as silica, tend to delay the separation of the microporous structure from the mother emulsion when the emulsion breaks and in this manner can also serve as a control on the resulting pore size.

DESCRIPTION OF THE PREFERRED EMBODIMENTS

Considering initially the materials that may be used in the present invention, the resin of the microporous structure may be generally any thermoplastic synthetic resinous composition such as cellulose acetate, cellulose acetate butyrate, ethyl cellulose, polymethyl methacrylate, polymethyl acrylate, polystyrene, polyvinyl chloride, polyvinylidene chloride, polyvinyl butyral, polyvinyl acetate, vinyl copolymers such as the copolymer of vinyl chloride and vinyl acetate, polyamides, polyvinyl alcohol, polyacrylonitrile, polymethyl styrene, polyesters of dicarboxylic acids and glycols, and the like. Especially useful are the polyalkylenes such as polyethylene, polypropylene, polybutylene, polyisobutylene, and copolymers thereof. Mixtures of resins are also contemplated. Very satisfactory results have been obtained from a mixture of polyethylene and a copolymer of ethylene and vinyl acetate in widely varying amounts, for example, from 10 percent to 90 percent by weight of polyethylene, the balance being the copolymer.

In order to modify properties of such resins where desirable, such as lowering their softening temperatures, etc., plasticizers may be included in an exemplary amount of about 40 percent to about 160 percent by weight of the resin. Plasticizers known in the art may be used. Reference is made, for example, to the list of plasticizers in column 4 of U.S. Pat. 3,055,297 to Leeds.

The liquid used to emulsify the melted thermoplastic resin need only be incompatible with the resin and desirably have sufficiently low vapor pressure at the temperature of the melted resin to avoid substantial loss through evaporation. However, it is also within the contemplation of the invention to place the emulsion system under pressure to suppress loss of emulsifying liquid when it is relatively volatile. After formation of the porous structure, the pressure may be released.

Water can be used as the emulsifying liquid for resins melting below the boiling point of water, for example, resins melting at temperatures between about 100° F. and 175° F. Indeed, if desired, although not necessary with the present invention, the emulsifying liquid may comprise a liquid which the resulting microporous structure is to express, such as ink or other liquid colorant, which may have either an aqueous or organic liquid base. In this manner, ink or other material to be transferred by the microporous structure can be used as the emulsifying liquid or incorporated directly with the emulsifying liquid, so that the pores of the structure are filled with ink or the like as they are formed. Soluble dyes are preferred but pigmented inks are usable, especially if the pigments are finely divided.

However, organic liquids are ordinarily used to form the emulsion, such as benzene, toluene, xylene, propyl alcohol, isopropyl alcohol, butyl alcohol, amyl alcohol, dioxane, kerosene, mineral spirits, cyclohexanone, butyl Cellosolve, dioxolane, carbon tetrachloride, naphtha, fuel oil, tricresyl phosphate, and the like, when such liquids do not have an appreciable solubilizing effect on the resin selected.

Polyols are a preferred class of organic liquids. The liquid polyol useful in the present invention may comprise a relatively simple, low molecular weight polyol, such as ethylene glycol or propylene glycol. But best results are obtained with the more complex, higher molecular weight polyols having up to about 12 carbon atoms, such as ethyl hexane diol, butyl carbitol, hexyl carbitol, butoxy triglycol, hexylene glycol, and octylene glycol.

The role of an additive to the polyol emulsion of the fused thermoplastic resin, designed to slow the breaking of the emulsion upon cooling as hereinafter more fully described, may be filled by a relatively large number of bulking, thickening, or stabilizing agents. Among these are silica, preferably in the form known as fumed or pyrogenic silica, clays like bentonite and kaolin, diatomaceous earth, talc, and the like. Even some of the thermoplastic resin previously noted have been found to have the desired effect in admixture with other different thermoplastic resins. For example, the celluloses such as methyl cellulose, ethyl cellulose, etc., and the acrylates including a copolymer of ethylene and vinyl acrylate can be used with other dissimilar resins. The particular synergistic mixture of polyethylene and a copolymer of ethylene and vinyl acetate has been previously noted.

Referring now to a process of using these materials, the thermoplastic resin is initially heated to a temperature sufficient to melt it. This may be either in the presence of the emulsifying liquid or such liquid may be subsequently added. Since the resin is melted, the original shape or size of the resin used is not important. For convenience, particle sizes or small slices of extruded shapes may be employed. The temperature of heating varies from about 100° F. to about 500° F., depending on the choice of resin, amount of plasticization, and the like. The lower temperatures are preferred for ease of working and avoidance of possible degradation or charring of the materials. The amount of emulsifying liquid used is not critical. Enough should be employed to form conveniently an emulsion of all of the resin present. Usually from about 50 percent to about 200 percent of emulsifying liquid by weight of the resin suffices.

The melted resin and emulsifying liquid are mixed by simple stirring until a homogenous emulsion results as contrasted with a dispersion or colloidal system. This may require from about five to about 45 minutes. Upon cooling, the emulsion reaches a point where it becomes unstable and "breaks." That is, the resin begins to coalesce and, due to its incompatibility with the emulsifying liquid, the resin forms a reticulated network which separates from the liquid with interstitial, interconnecting pores.

The pore size may be controlled by the rate of cooling the emulsion. The rate of separation of the reticulated resinous structure from the emulsifying liquid varies with cooling rates, although always following the same pattern. In general, the emulsion may be cooled at any desired rate until it reaches a point where it first becomes unstable under attendant conditions. Thereafter, the shorter the cooling time, as in reaching room temperature, the smaller the pore size, since the resin solidifies and stops the expansion of the pores. Conversely, relatively slow cooling results in larger pores.

Another technique of controlling pore size is to add a bulking, thickening, or stabilizing agent such as silica to the emulsion which has the tendency to increase its viscosity. The exact manner in which the additive aids in obtaining the desired pore sizes is not fully understood, but it is apparently equivalent to the effect of hastening the rate of cooling of the emulsion in that the emulsion breaks at a later time than it would if the additive were not present and/or the additive retards pore formation with the result that the average pore size is smaller in the resulting structure. The amount of the bulking, thickening, or stabilizing agent used depends upon the amount of retardation desired in breaking the emulsion. As a rule, the additive may comprise from about one to about five percent by weight of emulsion.

Because of the variables involved, particularly as complicated by the presence of absence of a stabilizing agent or, if present, the amount thereof, it is not always possible to predict beforehand a useful range of cooling rates to realize desired pore sizes from a given batch. Such ranges for any given emulsion composition may be easily determined by trail and error, the pore size being measured as by an electron microscope.

The critical period in the formation of the porous material is between the time when the emulsion first becomes unstable and a microporous structure begins to form. It is during this period that the cooling rate may be best employed to arrest the separation of the microporous network from the emulsifying liquid and thereby influence the resulting pore size. In general, an emulsion, especially if stabilized, may be cooled through its unstable and "breaking" stage at a rate within the range of about 40° F. per minute to about 15° F. per minute per unit volume.

If the emulsifying liquid comprises the liquid which the resulting microporous structure is intended to express, the microporous structure is ready for use after its formation. If the emulsifying liquid is not material to be expressed, the microporous structure is compressed to void such liquid. Thereafter, to load or reload a microporous structure of the present invention, it is necessary only to pour a liquid over the product and permit it to seep into and through the pores. Or the microporous product may lie in a reservoir of the liquid and receive its charge by absorption and gravity with simultaneous expulsion of the gas in the pores.

The following examples illustrate the invention and should not be construed as limiting the claims. Parts are by weight. In all of the examples, the average pore size of the microporous products, where stated, was determined by an electron microscope.

EXAMPLE 1

The formula used comprised:

| | Parts |
|---|---|
| Ethylene vinyl acetate | 40 |
| Butyl Carbitol | 40 |

These ingredients were mixed at 250° F. for 15 minutes and then poured into a mold at room temperature and allowed to cool under attendant conditions. A microporous pad resulted which accepted and received ink that was merely poured upon it.

EXAMPLE 2

The formulation of Example 1 was modified to include a dye so that the microporous product could be used as a transfer medium immediately after formation. The formulation was:

| | Parts |
|---|---|
| Copolymer of ethylene and vinyl acetate | 40 |
| Butyl Carbitol | 40 |
| Methyl violet | 3 |

The ingredients were mixed at 250° F. for 15 minutes and then poured into a stamp mold and allowed to cool. A handle was next attached to the resulting microporous structure to form a stamp which was found to provide sharp, uniform impressions. In place of methyl violet, other dyes could have been used such as methylene blue, methylene green, and the like.

EXAMPLE 3

This formulation illustrates both the use of a dye and a bulking, thickening, or stabilizing agent. The agent, silica, retarded separation of the resin from the polyol vehicle as the temperature of the emulsion was reduced.

| | Parts |
|---|---|
| Polyethylene | 40 |
| Ethyl hexane diol | 60 |
| Methyl violet | 4 |
| Fumed silica | 2 |

The polyethylene, ethyl hexane diol, and silica formed a stable emulsion above the fusion temperature of the polyethylene. The ingredients were mixed at 250° F. for 15 minutes and then poured into a stamp pad mold and allowed to cool to room temperature. The resulting microporous structure was tested as a stamp pad and found to transfer ink to a conventional rubber stamp having raised indicia when the stamp was pressed against the surface of the pad. Its average pore size was within the range of about 10 microns to 60 microns.

EXAMPLE 4

A stamp pad was made from the following formulation:

| | Parts |
|---|---|
| Copolymer of ethylene and vinyl acetate | 40 |
| Ethyl hexane diol | 40 |
| Methyl violet | 3 |

The ingredients were mixed at 250° F. for 15 minutes and then poured into a stamp pad mold and cooled slowly to room temperature. The slow cooling increased the pore size. The resulting pad was able to accept any liquid placed on its surface after the original ink, represented by the methyl violet, had been depleted. A pad made in this fashion could be re-inked repeatedly and have an exceptionally long, useful life.

EXAMPLE 5

The following formulation exemplifies the use of two thermoplastic resins, the second in smaller amount serving in place of the silica of the formulation of Example 3:

| | Parts |
|---|---|
| Polyethylene | 25 |
| Copolymer of ethylene and vinyl acetate | 5 |
| Hexol carbitol | 30 |

The two thermoplastic resins together with the liquid polyol formed a stable emulsion above the softening point of the polyethylene. The ingredients were mixed at 250° F. for 15 minutes and then poured into a stamp mold and allowed naturally to cool under ambient conditions. The resulting stamp pad readily absorbed conventional ink without later leaking the ink. The average pore size of the pad was within the range of about 10 microns to 60 microns.

EXAMPLE 6

Another useful formulation comprised:

| | Parts |
|---|---|
| Polyethylene | 30 |
| Copolymer of ethylene and isobutylacrylate | 5 |
| Hexol Carbitol | 40 |

The ingredients were mixed at 250° F. for 25 minutes and then poured into a stamp pad mold and allowed to cool to room temperature. The resulting microporous pad readily received conventional ink poured upon it and later transferred the ink to a conventional rubber stamp when the stamp was pressed against the surface of the pad.

EXAMPLE 7

The formulation used comprised:

| | Parts |
|---|---|
| Polyethylene | 45 |
| Copolymer of ethylene and vinyl acetate (40% vinyl acetate) | 10 |
| Ethyl hexane diol | 45 |

The polyethylene and copolymer of ethylene and vinyl acetate were heated to a temperature of 250° F. and completely melted. The diol was present during the heating, although it could have been added at this juncture. The mixture was next stirred to form an emulsion in which the diol was the continuous phase. While still at the temperature of 250° F., the mixture was poured into a stamp mold and cooled at the rate of 40° F. per minute per unit volume. The resulting microporous structure was found to have pores of an average size of 10 microns.

When the same composition was used to form another microporous structure wherein the emulsion was cooled at a rate of 6° F. per minute per unit volume, the resulting structure had an average port size of 100 microns. Slower cooling than 6° F. per minute per unit volume resulted in separation of the resin as layers of material. Faster cooling is limited only by the cooling equipment employed.

The formulation of this example comprised:

EXAMPLE 8

| | Parts |
|---|---|
| Copolymer of ethylene and vinyl acetate (40% vinyl acetate) | 4 |
| Polyethylene | 26 |
| Ethyl hexane diol | 25 |
| Methyl violet dye | 0.5–1.0 |
| Ethyl cellulose | 0.5 |

All ingredients were placed in a container and heated to 250° F. The mixture was then stirred for 15 minutes while maintaining the temperature at 250° F. The resulting emulsion was poured into a mold for a stamp pad and cooled sufficiently rapidly that the resulting microporous pad had an average pore size of about 10 microns to about 60 microns. The pad could be used directly, expressing the methyl violet dye. Other dyes, such as Victoria Pure Blue or Nigrosine, could have been used. The ethyl cellulose was added to reduce bleeding of the dye.

The resinous microporous structures of the present invention are easy to prepare, since no special heating or cooling equipment is necessary. The process does not require any milling or dispersing equipment for the thermoplastic resins but rather only a simple heated container, stirrer, mold and, optionally, cooling means.

The resinous microporous products of the present invention are especially suited for the transfer of ink, and in this capacity may be used as stamp pads, inking rollers, printing plates, type keys, and the like. However, the present structures are also adapted for absorbing in their pore systems and later expressing still other materials such as perfumes, deodorants, medicinal agents, cosmetics, and the like.

The larger pore sizes possible with the instant invention not only enables the microporous structures to be re-loaded many times without being subject to objectional leakage between loadings, but the increased pore size provides a greater range of application as to the materials that can be loaded and subsequently transferred. Similarly, the larger pore size, as compared with that of prior resinous microporous structures, results in a greater and/or more facile exudation of the material when the structure is even slightly compressed.

While the foregoing describes several embodiments of the present invention, it is understood that the invention may be practiced in still other forms within the scope of the following claims.

What is claimed is:

1. A process for forming a resinous, porous structure adapted to absorb and express a predetermined material a plurality of times, said structure having a pore size adapted to minimize leakage of the material and yet effective to permit reloading of the structure with said material, comprising:
    (a) heating a thermoplastic resin to a temperature and for a time sufficient to melt it,
    (b) forming an emulsion of the melted thermoplastic resin with a liquid incompatible with the resin,
    (c) cooling the emulsion to solidify the resin and separate it from the incompatible liquid as a porous, reticulated structure, and
    (d) controlling the average size of the pores of said solidified, reticulated structure within the range of about 10 microns to about 60 microns by cooling the emulsion during solidification of said resin at an average rate of about 15° F. per minute to about 40° F. per minute.

2. The process of claim 1 wherein said thermoplastic resin is selected from the group consisting of polyethylene, polypropylene, polybutylene, polyisobutylene, and copolymers thereof.

3. The process of claim 1 wherein said emulsifying liquid is an organic liquid.

4. The process of claim 1 wherein said emulsifying liquid is a polyol selected from the group consisting of ethyl hexane diol, butyl Carbitol, hexol Carbitol, butoxy triglycol, hexylene glycol, and octylene glycol.

5. The process of claim 1 including stabilizing the emulsion prior to cooling.

6. The process of claim 5 wherein silica is used to stabilize the emulsion.

7. The process of claim 5 wherein a polyvinyl resin is used to stabilize the emulsion.

8. The process of claim 7 wherein said polyvinyl resin is ethylene vinyl acetate copolymer.

9. The process of claim 7 wherein said vinyl resin is ethylene vinyl acetate copolymer and said thermoplastic resin is polyethylene.

10. The process of claim 1 including adding said predetermined material to the emulsion at any time prior to cooling to form the microporous structure with said material in place.

11. The process of claim 1 wherein said incompatible liquid is retained in liquid form while said resin is being solidified to define pores therein.

12. A resinous, porous structure produced in accordance with the process of claim 1.

13. A process for forming a resinous, porous, reticulated structure comprising liquifying a thermoplastic resin by heat, emulsifying the liquid resin with a liquid incompatible therewith, cooling to break the emulsion and form two admixed liquid phases, one liquid phase being of said resin and the other liquid phase being of said incompatible liquid, continuing to cool the two admixed phases to solidify the resin phase while retaining the incompatible liquid phase as a liquid to define pores in the solidified resin, and controlling the average pore size in the resulting solidified resin by controlling the rate of cooling of the two admixed liquid phases.

References Cited

UNITED STATES PATENTS

| 2,981,979 | 5/1961 | Seefluth | 260—2.5 M |
| 3,048,537 | 8/1962 | Pall et al. | 260—2.5 M |
| 3,378,507 | 4/1968 | Sargent et al. | 260—2.5 M |

FOREIGN PATENTS

| 873,178 | 7/1961 | Great Britain | 260—2.5 M |

SAMUEL H. BLECH, Primary Examiner

W. J. BRIGGS, Sr., Assistant Examiner

U.S. Cl. X.R.

118—264, 270; 252—346; 260—2.5 R, 2.5 HA, 33.4 PQ, 33.4 R, 94.1, 94.8, 94.9 GD, 896, 897